July 7, 1925.

S. E. ALLEY

TRANSPORT VEHICLE

Filed Aug. 13, 1923

Inventor
S. E. Alley
By
Watson, Coit, Moore & Grindle
Attorneys

July 7, 1925.

S. E. ALLEY 1,545,180

TRANSPORT VEHICLE

Filed Aug. 13, 1923

INVENTOR
Stephen E. Alley.
BY Watson, Coit, Morse
& Grindle,
ATT'YS.

Patented July 7, 1925.

1,545,180

UNITED STATES PATENT OFFICE.

STEPHEN EVANS ALLEY, OF LONDON, ENGLAND, ASSIGNOR TO THE "SENTINEL" WAGGON WORKS (1920) LIMITED, OF WESTMINSTER, LONDON, ENGLAND, A BRITISH COMPANY.

TRANSPORT VEHICLE.

Application filed August 13, 1923. Serial No. 657,241.

*To all whom it may concern:*

Be it known that I, STEPHEN EVANS ALLEY, a subject of the King of England, residing in London, England, have invented certain new and useful Improvements in Transport Vehicles, of which the following is a specification.

This invention is for improvements in or relating to transport vehicles of the type in which tractor and trailer vehicle parts are employed with a turntable connection between such parts whereby the load of the trailer is partly supported upon the rear of the tractor. The invention has for one of its objects to provide more efficient means for connecting the two vehicle parts together and generally to improve the efficiency and utility of the vehicles.

According to the primary feature of the present invention there is provided a transport vehicle of the type described which is characterized in that the turntable is connectd to the chassis of one of the vehicle parts by spring-controlled pivotal couplings situated on each side of the longitudinal axis of the vehicle passing through the central pivot of the turntable, which couplings are so movable relatively to the said chassis and turntable as to accommodate both front and rear, and lateral, relative tilting of these two said parts. Thus while the normal operation of the turntable will not be in any way impeded, the vehicle parts will be able to move relatively to each other in accommodating inequalities in the road surface without throwing abnormal work upon the usual vehicle springs. Conveniently, though not essentially, the turntable is rigidly connected to the trailer and is connected by the aforesaid spring-controlled couplings to the tractor. The couplings are arranged in lateral alignment with the turntable axis, that is to say the two couplings and the turntable axis lie in a single vertical plane transversely of the vehicle.

According to another feature of the invention the couplings are so constructed as to provide for universal movement between the parts they connect, and it is preferred to arrange the couplings to be each slidable bodily longitudinally of their length, relatively to one of the parts they connect, against resilient controlling pressure.

The invention also includes certain features, hereinafter described, in relation to the lubrication of the couplings and the turntable, and to the construction of the trailer, while according to a further feature the main longitudinals of the tractor chassis and the main longitudinals of the trailer chassis are so spaced as to be out of coincidence vertically one above the other when the two vehicle parts are in straight-line position. Heretofore, in order to provide the requisite clearance between the tractor and trailer to permit of relative vertical movement between these two parts when the vehicle is traversing uneven ground, the height of the trailer, which, of course, usually reaches on to the top of the tractor, has been made rather too high for the convenient manipulation of loads to and from it. Most of the variation of the relative height of the vehicle parts occurs when the vehicle is travelling in a straight-line position, and it will be appreciated, therefore, that by this feature of the invention the requisite clearance between the two sets of chassis longitudinals is provided when most needed. The clearance requisite to deal with variations in relative height when the vehicle is turning can readily be given without making the trailer an inconvenient height above the ground.

For a more complete understanding of the invention there will now be described, by way of example only and with reference to the accompanying drawings, certain constructional forms of vehicle according to the invention. It is to be understood, however, that the invention is not limited to the precise constructional details set forth.

In these drawings:—

Figure 4 is a detail vertical sectional view of certain of the parts shown in Figure 2 taken on the line 4—4 of Figure 3, and Figure 5 is a view somewhat similar to Figure 2, but on a smaller scale, showing a modified construction.

Like reference numerals indicate like parts throughout the drawings.

Figure 1:
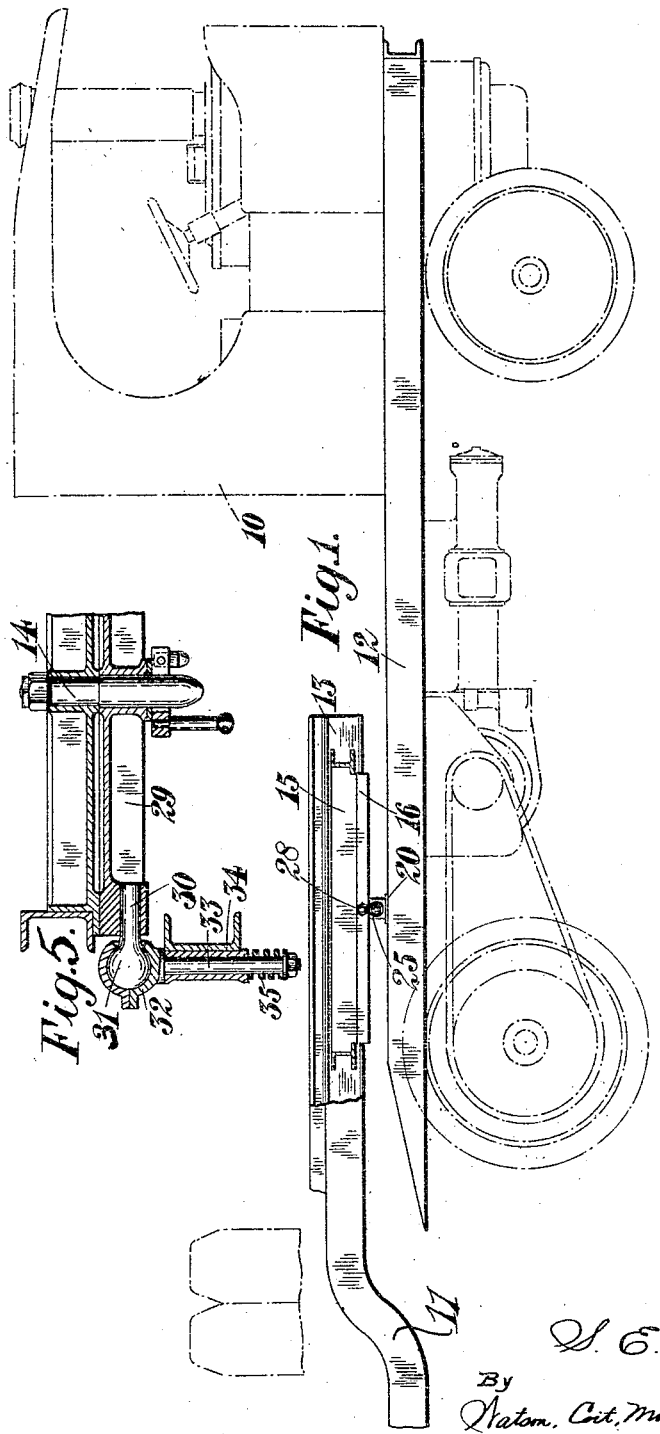
Figure 1 is a side elevation of a portion of the vehicle, certain of the parts being shown in dot and dash lines and other parts in vertical section on a line longitudinally of the vehicle.

Referring firstly to Figures 1–4, the vehicle illustrated is of the well known type comprising a four wheeled tractor 10 and a two wheeled trailer 11. Only the fore part of the latter, however, is illustrated. The chassis longitudinals of the tractor are shown at 12 and the forward ends of the trailer longitudinals at 13, the latter overlying the tractor. The trailer and tractor are rotatively connected together by a turntable pin 14 situated at the axis of a turntable comprising two main parts 15 and 16. The turntable part 15 is built into the trailer chassis, while the turntable part 16 is connected to the tractor chassis by spring-controlled pivotal couplings constituting the primary feature of the present invention. These couplings are situated one on each side of the turntable pin 14 and each include a rod 17 having a plain cylindrical end 18 and a ball shaped end 19, the rod being mounted vertically with the ball at its lower end. The end 18 of the rod is slidably received in a cylindrical bearing 20 supported by the member 16 while the ball 19 is received in a spherical bearing comprising two co-operating parts 21 and 22. The outer surface of the part 21 is curved in the longitudinal direction of the vehicle, see Figure 4, to co-operate with the correspondingly curved lower surface 23 of the bearing 20. The rod is controlled by a spring 24 which tends to maintain the parts 20 and 21 in contact with each other but which permits them to separate should there be any necessity for one side of the turntable to lift away from the tractor chassis temporarily in accommodating an uneven road surface. A lubricating duct is shown at 25 for conveying grease or other lubricant, under pressure if desired, to the internal surface of the bearing 20 from whence it is free to drain down into the spherical bearing. In this way efficient lubrication is secured without waste.

The resilient couplings just described will connect the turntable to the tractor chassis with any required degree of stability while at the same time permitting the vehicle to adjust itself during travel without throwing undue stress upon the main vehicle springs.

The turntable part 16 is formed with a sunk horizontal guiding and lubricant-retaining channel 26 while the turntable part 15 has a depending projection 27 which is received in this channel. In this way an efficient turntable bearing is provided while by supplying grease or other lubricant, under pressure if desired, through the duct 28, the turntable bearing may be kept properly lubricated.

Figure 2:
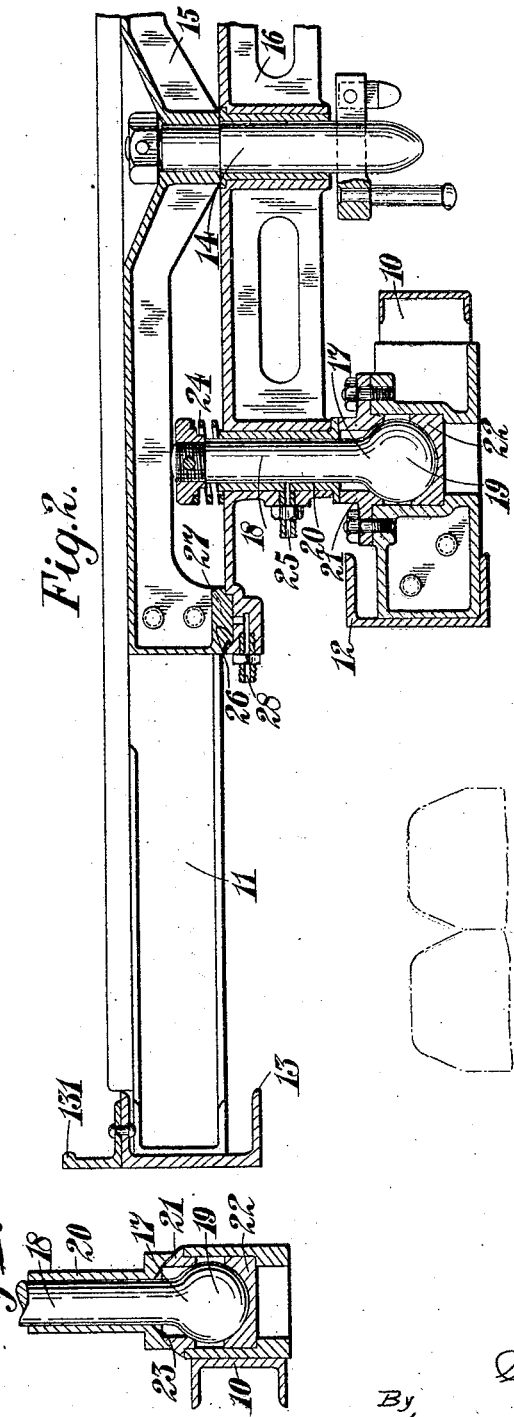
Figure 2 is a partial vertical cross-section of the vehicle, on a scale larger than that of Figure 1, the section being taken through the axis of the turntable.
Figure 3:
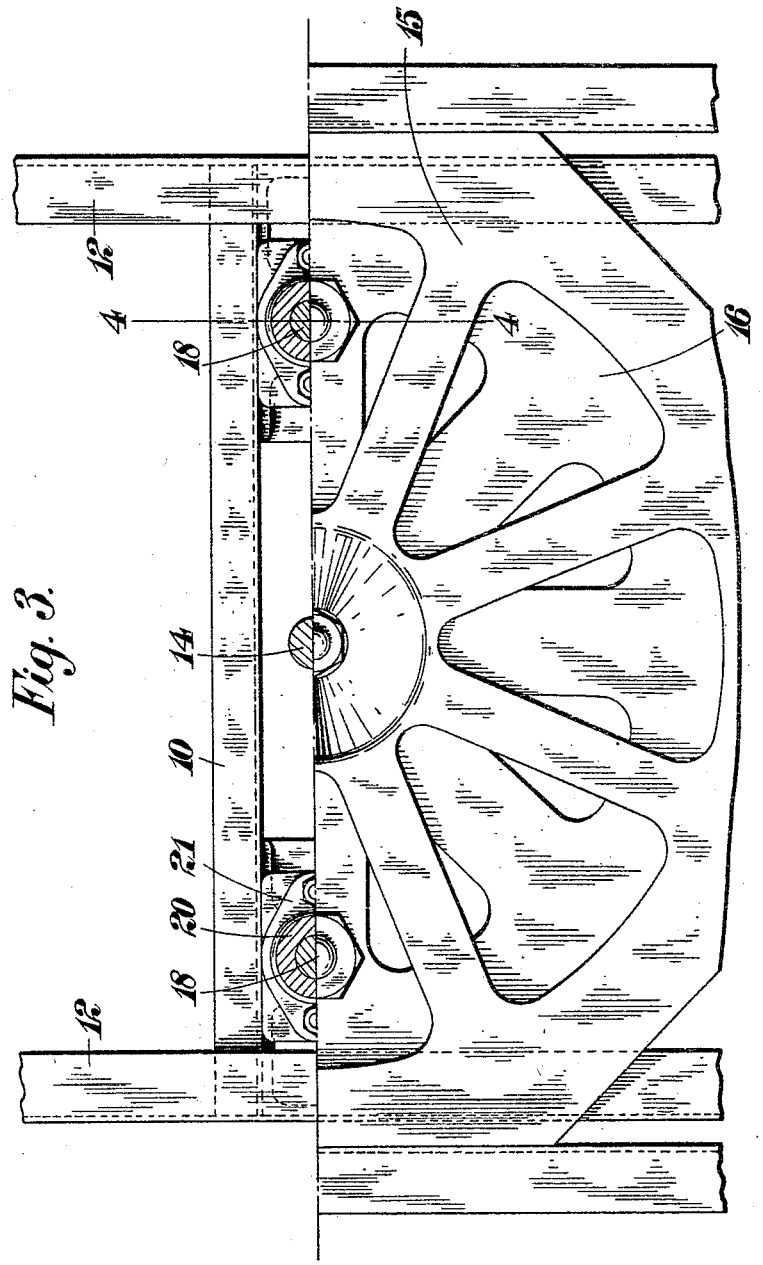
Figure 3 is a plan view partly in horizontal section of the turntable shown in Figure 2.

It will be seen by reference to Figure 2 that the tractor chassis longitudinals 12 are arranged closer to the longitudinal centre line of the vehicle than are the trailer longitudinals 13. Thus, when the vehicle is travelling straight ahead, these two sets of longitudinals will not foul one another even though uneven ground be traversed. Consequently the longitudinals 13 may be brought lower than would otherwise be possible and thus the loading and unloading of goods on and from the trailer facilitated.

Above the longitudinals 13 are reinforcing angles or bulb angles 131 which in addition to strengthening the trailer (which is desirable owing to the length of the latter and to the loads carried) also serve as side skid rails.

In the construction shown in Figure 5, the lower turntable part 29 carries rods 30 having spherical ends 31 which are received in bearings 32 at the upper ends of rods 33. The rods 33 are each received in a bearing 34 and are vertically movable therein under the control of a spring 35. In this way both front and rear, and lateral, relative tilting of the tractor and the lower turntable part 29 are provided for, the arrangement being in many respects similar to that illustrated in the preceding figures.

It is to be understood that the invention is not limited to the precise constructional details hereinbefore set forth.

What I claim as my invention and desire to secure by Letters Patent is:

1. In a transport vehicle, the combination with a tractor vehicle part, and a trailer vehicle part, of a turntable comprising two portions whereof one is carried by the one vehicle part and is rotatable about a vertical axis passing through that vehicle part and both said portions, and coupling means connecting the second turntable portion to the second vehicle part, which coupling means include a simple pivot in the form of a cylindrical stem rotatable about its longitudinal axis in said second turntable portion, which stem has at one end a spherical head, and a spring controlled socket mounted on the second vehicle part and receiving said head so as to permit universal movement between said stem and the second vehicle part.

2. In a transport vehicle, the combination with a tractor vehicle part and a trailer vehicle part, of a turntable connection between such parts whereby the load of the trailer is partly supported upon the rear of the tractor, and extensible universally jointed couplings connecting the turntable to the chassis of one of said vehicle parts for accommodating both front and rear, and lateral relative tilting of these two said parts, which couplings are situated one on each side of the longitudinal axis of the vehicle passing through the turntable axis of rotation, and are each in the form of a spring controlled member having a ball-shaped end and a cylindrical stem, the ball-shaped ends being received each in a spherical bearing in the one vehicle part and the stems being slidable endwise each in a cylindrical bearing in the other vehicle part.

3. In a transport vehicle, the combination with a tractor vehicle part and a trailer vehicle part, of a turntable connection between such parts whereby the load of the trailer is partly supported upon the rear of the tractor, and resilient pivotal couplings connecting the turntable to the chassis of one of said vehicle parts, such couplings being situated on each side of the line longitudinally of the said vehicle part which passes through the turntable axis and being so movable relatively to the said chassis and turntable as to accommodate both front and rear, and lateral, relative tilting of these two said parts and said couplings each including a rod with one plain cylindrical and one ball-shaped end, which rod is mounted vertically with the ball at its lower end in a spherical bearing and its plain cylindrical end is slidably received in a cylindrical bearing.

4. In a transport vehicle, the combination with a tractor vehicle part and a trailer vehicle part, of a turntable connection between such parts whereby the load of the trailer is partly supported upon the rear of the tractor, spherical bearings in the tractor chassis situated on each side of the line longitudinally of such chassis which passes through the turntable axis, correspondingly situated cylindrical bearings in the turntable, coupling rods one appropriated to each of the said spherical bearings and each having one plain cylindrical and one ball-shaped end and being mounted vertically with the ball at its lower end in one of the said spherical bearings and its plain cylindrical end slidably received in the corresponding cylindrical bearing, and a spring surrounding each rod and operative to resist sliding movement of the rod in its cylindrical bearing.

5. In a transport vehicle, the combination with a tractor vehicle part and a trailer vehicle part, of a turntable connection between such parts whereby the load of the trailer is partly supported upon the rear of the tractor, spherical bearings in the tractor chassis situated on each side of the line longitudinally of such chassis which passes through the turntable axis, correspondingly situated cylindrical bearings in the turntable, coupling rods one appropriated to each of the said spherical bearings and each having one plain cylindrical and one ball-shaped end and being mounted vertically with the ball at its lower end in one of the said spherical bearings and its plain cylindrical end slidably received in the corresponding cylindrical bearing, a spring surrounding each rod and operative to resist sliding movement of the rod in its cylindrical bearing, means for supplying lubricant to the cylindrical bearing and means permitting such lubricant to drain down into the corresponding spherical bearing.

In testimony whereof I affix my signature.

STEPHEN EVANS ALLEY.